United States Patent
Bates

(10) Patent No.: US 12,431,601 B2
(45) Date of Patent: Sep. 30, 2025

(54) PRINTED MICROSTRIP FILTER

(71) Applicant: Knowles Cazenovia, Inc., Cazenovia, NY (US)

(72) Inventor: David Bates, Fayetteville, NY (US)

(73) Assignee: Knowles Cazenovia, Inc., Cazenovia, NY (US)

( * ) Notice: Subject to any disclaimer, the term of this patent is extended or adjusted under 35 U.S.C. 154(b) by 331 days.

(21) Appl. No.: 18/138,317

(22) Filed: Apr. 24, 2023

(65) Prior Publication Data

US 2023/0344101 A1    Oct. 26, 2023

Related U.S. Application Data

(60) Provisional application No. 63/334,952, filed on Apr. 26, 2022.

(51) Int. Cl.
*H01P 1/203* (2006.01)
*H01P 1/212* (2006.01)
*H01P 7/08* (2006.01)

(52) U.S. Cl.
CPC .......... *H01P 1/20309* (2013.01); *H01P 1/212* (2013.01); *H01P 7/082* (2013.01)

(58) Field of Classification Search
CPC ...... H01P 1/20309; H01P 1/212; H01P 1/203; H01P 7/082
USPC ....................................................... 333/202
See application file for complete search history.

(56) References Cited

U.S. PATENT DOCUMENTS

| | | | |
|---|---|---|---|
| 7,956,708 B2 | 6/2011 | Bates et al. | |
| 9,490,768 B2 | 11/2016 | Randall et al. | |
| 10,770,776 B2 | 9/2020 | Bates | |
| 11,108,158 B2 | 8/2021 | Bates | |
| 2020/0076032 A1* | 3/2020 | Gavryliuk | H01P 1/20327 |
| 2020/0259263 A1 | 8/2020 | Dani | |

(Continued)

FOREIGN PATENT DOCUMENTS

| | | |
|---|---|---|
| CN | 203218416 U | 9/2013 |
| CN | 109273809 A | 1/2019 |

(Continued)

OTHER PUBLICATIONS

Hong and Lancaster; Microstrip Filters for RF/Microwave Applications; pp. 101, 126, 127, 130, 132, 133 and 152; John Wiley and Sons, Inc., New York, copyright 2001.

(Continued)

*Primary Examiner* — Andrea Lindgren Baltzell
*Assistant Examiner* — Abigail Amir Yaldo
(74) *Attorney, Agent, or Firm* — Hickman Becker Bingham Ledesma LLP; Matthew C. Loppnow

(57) ABSTRACT

A printed film RF micros trip bandpass filter includes a plurality of resonators disposed on a dielectric substrate, first and second input/output (I/O) interfaces connected to corresponding first and second resonators flanking one or more intermediate resonators. Opposite ends of the one or more intermediate resonators are connected to a ground plane on an opposite side of the substrate by corresponding conductors. The intermediate resonators have an electrical wavelength that is one-half a wavelength of a center frequency of the filter and the first and second resonators can have an electrical wavelength that is nominally one-half the wavelength of the bandpass filter center frequency.

20 Claims, 5 Drawing Sheets

(56) References Cited

U.S. PATENT DOCUMENTS

2020/0358160 A1 11/2020 Alton
2020/0403286 A1 12/2020 Burdick
2022/0416747 A1 12/2022 Alton

FOREIGN PATENT DOCUMENTS

KR 102010097392 A 9/2010
WO WO2020080090 A1 4/2020

OTHER PUBLICATIONS

Matthaei, Young, and Jones; Microwave Filters Impedance-Matching Networks and Coupling Structures; pp. 586-587, Artech House, Inc., Norwood MA, copyright 1980, printed Nov. 1985—identified at beginning of book as a reprint of the edition published by McGraw-Hill Book Company, Inc., 1964.

\* cited by examiner

PRINTED MICROSTRIP FILTER

FIELD OF THE DISCLOSURE

The present disclosure relates generally to radio frequency (RF) filters and more particularly to printed film RF filters having one-half wavelength resonators shorted to ground.

BACKGROUND

Printed film RF filters generally comprise thick or thin film resonators and other conductive elements deposited on a dielectric substrate. Such filters are typically integrated with a microstrip or other impedance controlled transmission line on a printed circuit board (PCB) and commonly used at or near the front-end of communications and radar systems where insertion loss, frequency selectivity and power considerations are paramount. One such printed film microstrip filter is a one-quarter wavelength bandpass filter comprising partially-grounded resonators having one end grounded (short circuited) and the other end ungrounded (open circuited). However, printed film one-quarter wavelength resonators tend to result in less than desirable insertion loss, stopband rejection, and deviation from a desired flat and low loss passband. Thus, there is a desire to provide printed film filters having lower loss, improved frequency selection and other passband characteristics.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described and that some actions or steps may be performed concurrently unless specified otherwise, and that the terms and expressions used herein have the meaning understood by those of ordinary skill in the art except where different meanings are attributed to them herein.

DETAILED DESCRIPTION

The disclosure relates generally to radio frequency (RF) filters and more particularly to printed film RF filters having one-half wavelength resonators shorted to ground. Printed film filters generally comprise thick or thin film resonators and other conductive elements deposited on a dielectric substrate mountable on a printed circuit board (PCB) or other host circuit. Thick film filter elements typically have a thickness in a range between 0.5 thousandths (mils) and 2.0 mils and can be formed of a metallic paste screen printed on the substrate. Thin film filters typically have a thickness of roughly two skin depths. "Skin depth" as used herein is the depth where the current density is about 1/e of the current density at the surface of the film. A film thickness less than two skin depths may adversely affect insertion loss. Film thicknesses greater than two skin depths provide no appreciable benefit and may degrade the accuracy of metal deposition. For example, for a 10 GHz filter having a conductive film with good conductivity (e.g., copper, silver, gold . . . ), two skin depths is on the order of 0.06 mil. Thin film deposits can be patterned by various means and deposited on the substrate by chemical vapor deposition, e-beam deposition, or sputtering, among other known or future thin film deposition processes. Representative embodiments are described further herein.

A printed film RF filter generally comprises a dielectric substrate having a ground plane on one surface thereof and resonator elements on an opposite surface. Characteristics of the dielectric material depend generally on the filter specifications, like frequency and insertion loss among other consideration. Suitable dielectric materials generally having a relatively high quality (Q) factor and a stable temperature coefficient. In some filter implementations, the dielectric material has a Q factor greater than 1000. One representative dielectric material is a high purity alumina ceramic, which can have a Q factor as high as 5000 and a relative dielectric constant of about 10. Other ceramics and other dielectric materials can also be used.

Figure 1:
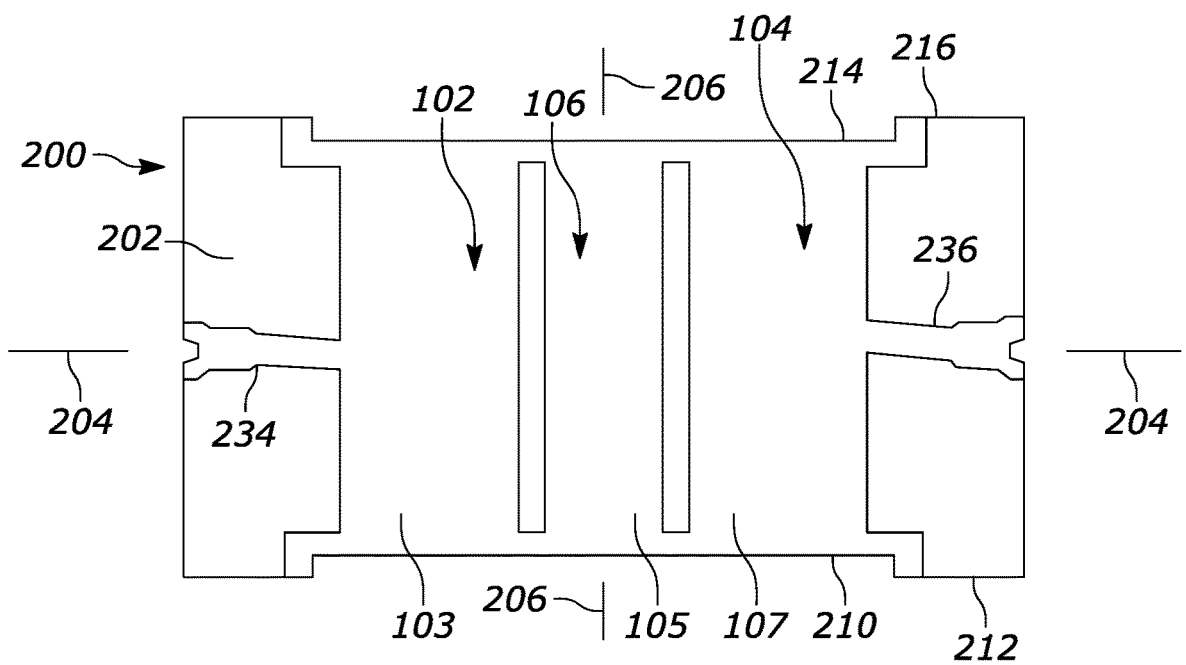
FIG. 1 is a plan view of an RF filter according to a first embodiment.
Figure 6:
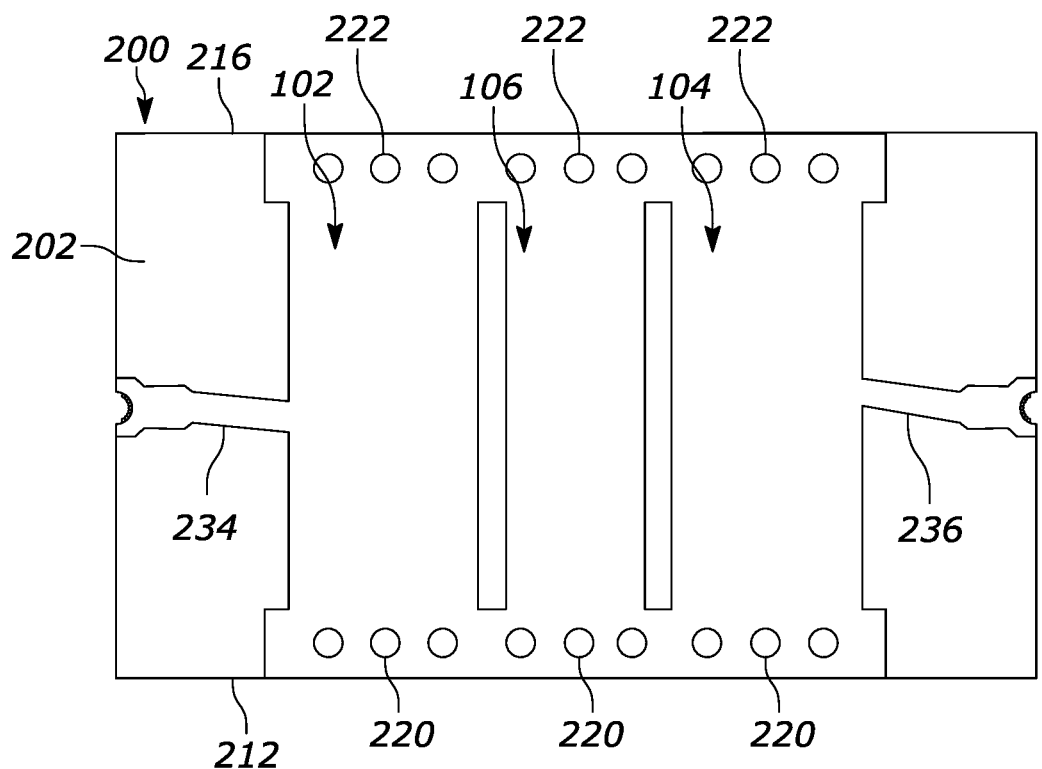
FIG. 6 is an RF filter according to a second embodiment.
Figure 7:
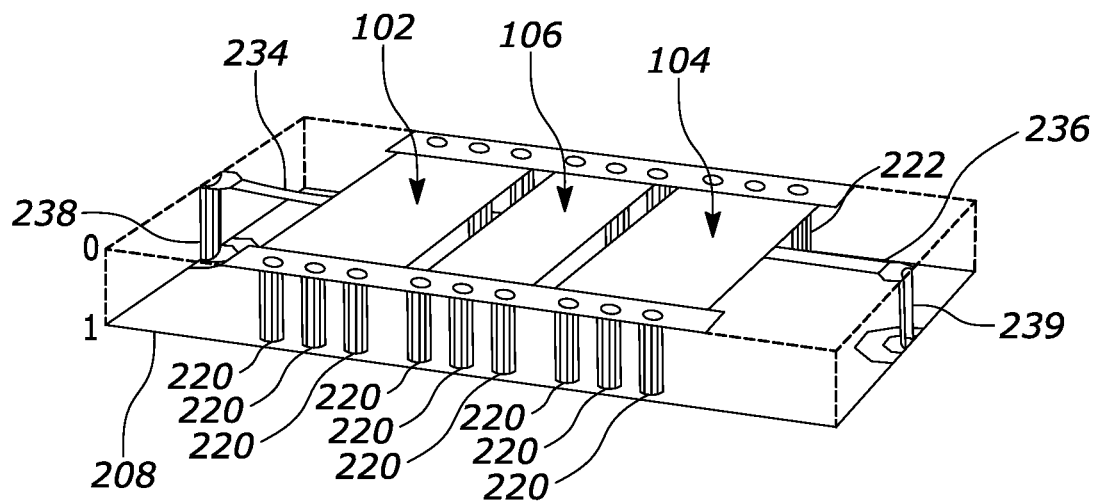
FIG. 7 is an isometric view of the RF filter of FIG. 6 without the substrate supporting the conductive portions of the filter.
Figure 8:
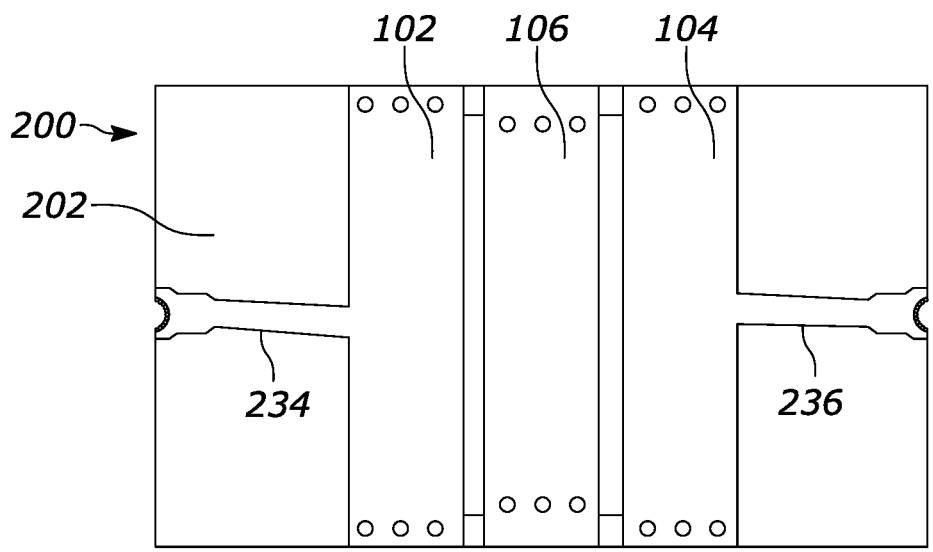
FIG. 8 is an RF filter according to a third embodiment.

In FIGS. 1, 6 and 8, first and second resonators 102, 104 are located on a surface 202 of the substrate 200 and connected to input/output (I/O) interfaces as described further herein. One or more intermediate resonators can also be located on the surface 202 of the substrate between the first and second resonators. Adjacent resonators are separated by a dielectric gap. Electromagnetic coupling among the resonators is a function of a space defined by the dielectric gap. In embodiments where there are multiple intermediate resonators, reflections due to impedance mismatch can be reduced by providing a relatively large gap between adjacent intermediate resonators and providing a relatively small gap between the intermediate resonators adjacent the resonators coupled to the I/O interfaces. In FIGS. 1, 6, 7 and 8, one intermediate resonator 106 is located between the first and second resonators 102, 104. The filter order is associated with the number of resonators. FIGS. 1, 6, 7 and 8 illustrate third order bandpass filters comprising three resonators. Higher order filters can result from additional resonators.

The resonators and other conductive portions can be arranged symmetrically about a longitudinal axis 204 and a transverse axis 206 of the substrate, as shown in FIG. 1. In other implementations the resonators can be aligned asymmetrically about the longitudinal and/or transverse axes of the substrate. Symmetrical configuration of the resonators and other conductor elements on the substrate may improve filter performance.

Figure 2:
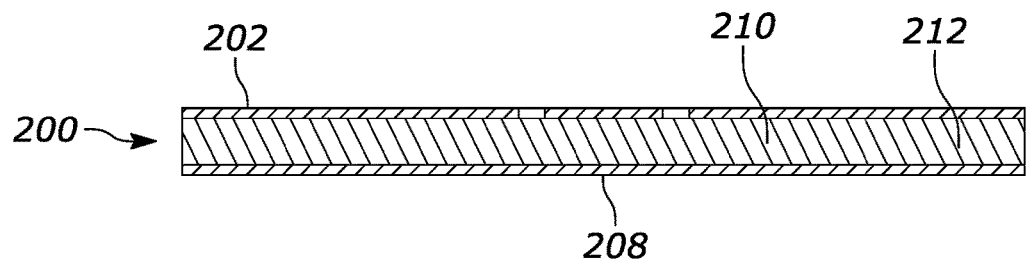
FIG. 2 is a side view of the RF filter of FIG. 1.

Opposite ends of the resonators are generally coupled to the ground plane 208 shown in FIGS. 3, 4, 5 and 7. Insertion loss can be reduced if the resonators are coupled to the ground plane by conductors rather than by a capacitive coupling. In FIG. 1, a first conductor 210 on a first side wall 212 of the substrate connects the ground plane 208 to first ends 103, 105 and 107 of the resonators and a second conductor 214 on a second side wall 216 of the substrate, opposite the first side wall, connects the ground plane to second ends of the resonators. FIG. 2 shows the first conductor 210 located on the first side wall 212. In the alternative implementations of FIGS. 6, 7 and 8, a first plurality of conductive vias 220 extending through the substrate and along a first side wall of the substrate connects the ground plane to the first ends of the resonators and a second plurality of conductive vias 222 extending through the substrate and along a second side wall of the substrate connects the ground plane to the second ends of the resonators.

Figure 3:
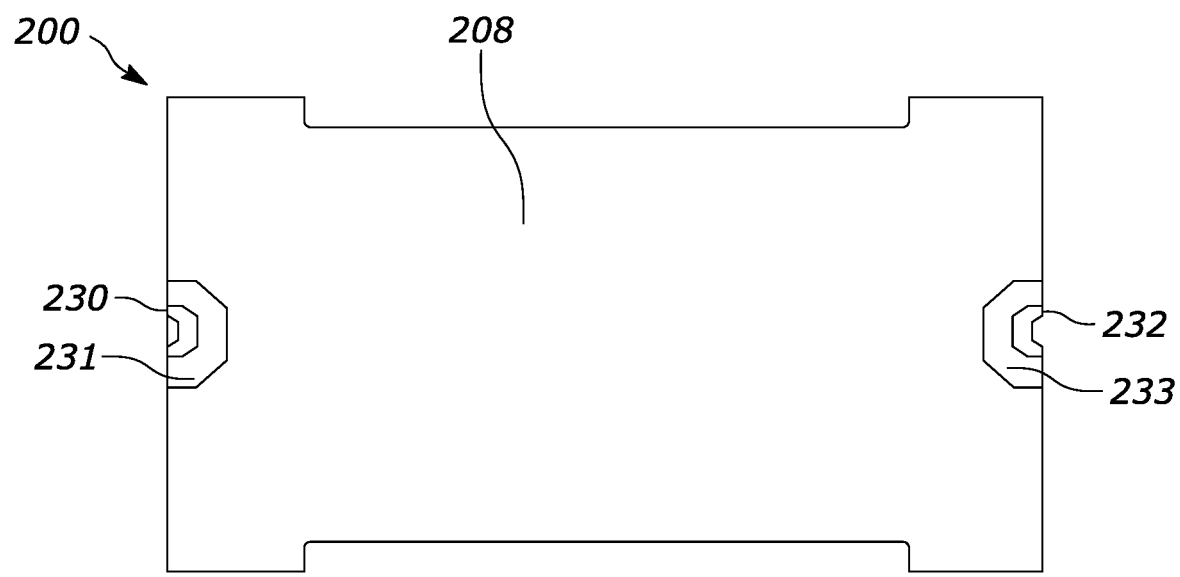
FIG. 3 is a bottom plan view of the RF filter of FIG. 1.

The first and second resonators are connected to corresponding I/O interfaces on the substrate. The filters described herein can generally be designed to have a 50 ohm impedance at the I/O interfaces. A 50 ohm interface impedance is characteristic of microwave systems. In other implementations however the impedance of the I/O interface can be other than 50 ohms. In FIG. 3, first and second I/O interfaces 230, 232 and the ground plane 208 are located on a common surface of the substrate. The I/O interfaces are spaced apart from the ground plane by corresponding dielectric portions 231, 233 of the substrate. In FIGS. 1 and 6-8, the first and second resonators are connected to corresponding first and second I/O interfaces by corresponding conductors 234, 236 on the surface of the substrate. FIG. 7 shows the conductors 234, 236 connected to the I/O interfaces by corresponding castellations 238, 239 extending through the substrate. The castellations are shown on corresponding end walls of the substrate. Alternatively, the castellations can be located inwardly of the end walls. In other implementations, alternatively, the I/O interfaces can be on the same surface of the substrate as the resonators.

The resonators have a length extending between lateral side portions of the substrate. In FIGS. 1, 6 and 7, the resonators have a common length and the first and second resonators have a greater width than a width of the one or more intermediate resonators. Increasing the width of the resonators connected to the I/O interfaces, relative to the width of the intermediate resonators, can compensate for external loading by the I/O interfaces. In FIG. 8, the first and second resonators have a longer length than the one or more intermediate resonators. Increasing the length of the resonators connected to the I/O interfaces, relative to the length of the intermediate resonators, can also compensate for external loading. Generally, the one or more intermediate resonators have a length to width aspect ratio not greater than 8 and the first and second resonators have an aspect ratio less than an aspect ratio of the one or more intermediate resonators.

The one or more intermediate resonators have an electrical wavelength that is one-half a wavelength of the filter center frequency. The resonators connected to the I/O interfaces can also have an electrical wavelength that is one-half the wavelength of the center frequency. Alternatively, the resonators coupled to the I/O interfaces can have an electrical wavelength that is nominally one-half the wavelength of the bandpass filter center frequency, wherein "nominally" means that the electrical wavelength can be as much as 8% greater than one-half the wavelength of the filter center frequency. The additional electrical wavelength of the first and second resonators may be required to produce resonance at the filter center frequency in the presence of loading from adjacent resonators and the characteristic loading of the I/O interfaces among other sources. As suggested herein, the electrical wavelength depends generally on the width and/or length of the resonator.

Figure 4:
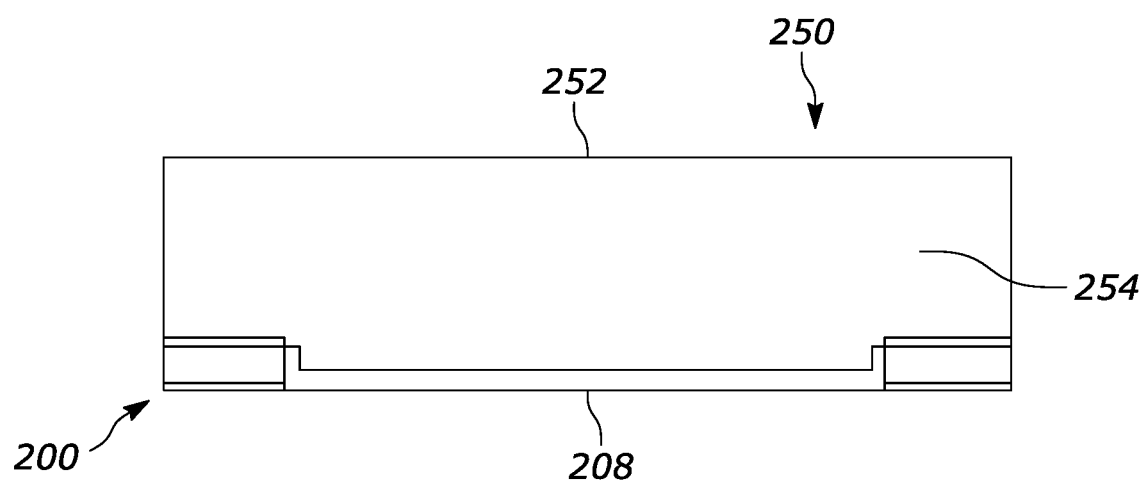
FIG. 4 is a side view of an RF filter having a cover.
Figure 5:
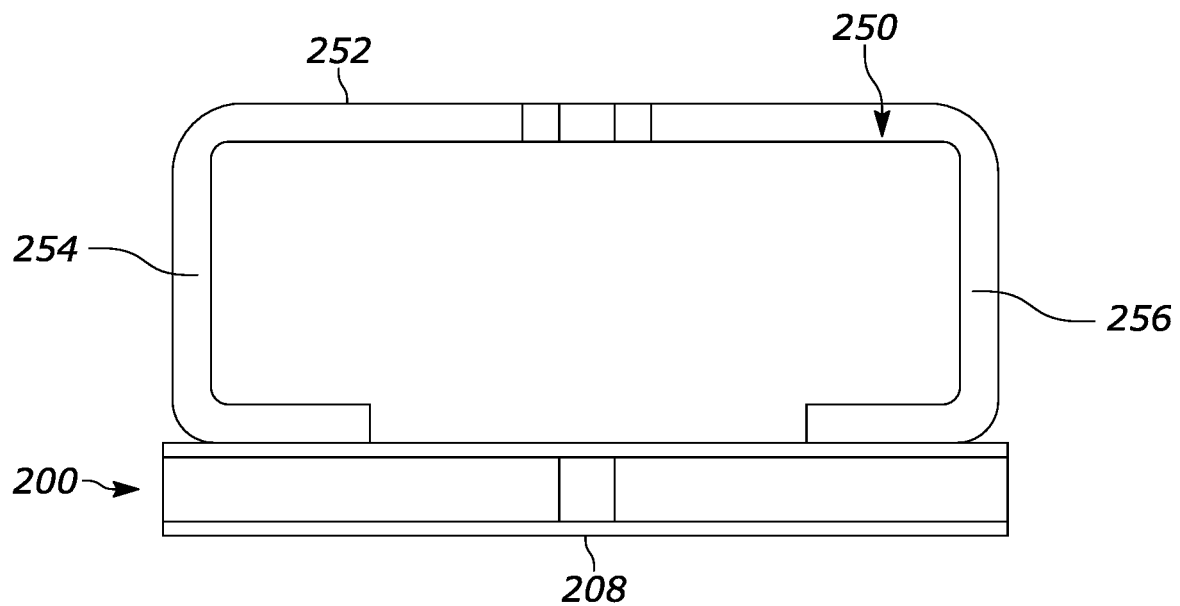
FIG. 5 is an end view of the RF filter of FIG. 4.

In some implementations, optionally, a conductive cover is placed over the resonators on the substrate. In FIG. 4, the filter includes a cover 250 covering a portion of the resonators on the substrate. The cover comprises a conductive metal having a top wall 252 connecting opposite side walls 254, 256. Ends of the cover can remain open so that there is a passage beneath the cover. In FIG. 4, the opposite side walls 254, 256 of the cover are connected to the corresponding conductive surfaces 210, 214 on the substrate. A cover is not required, but filter performance may be improved if the substrate is covered.

Figure 9:
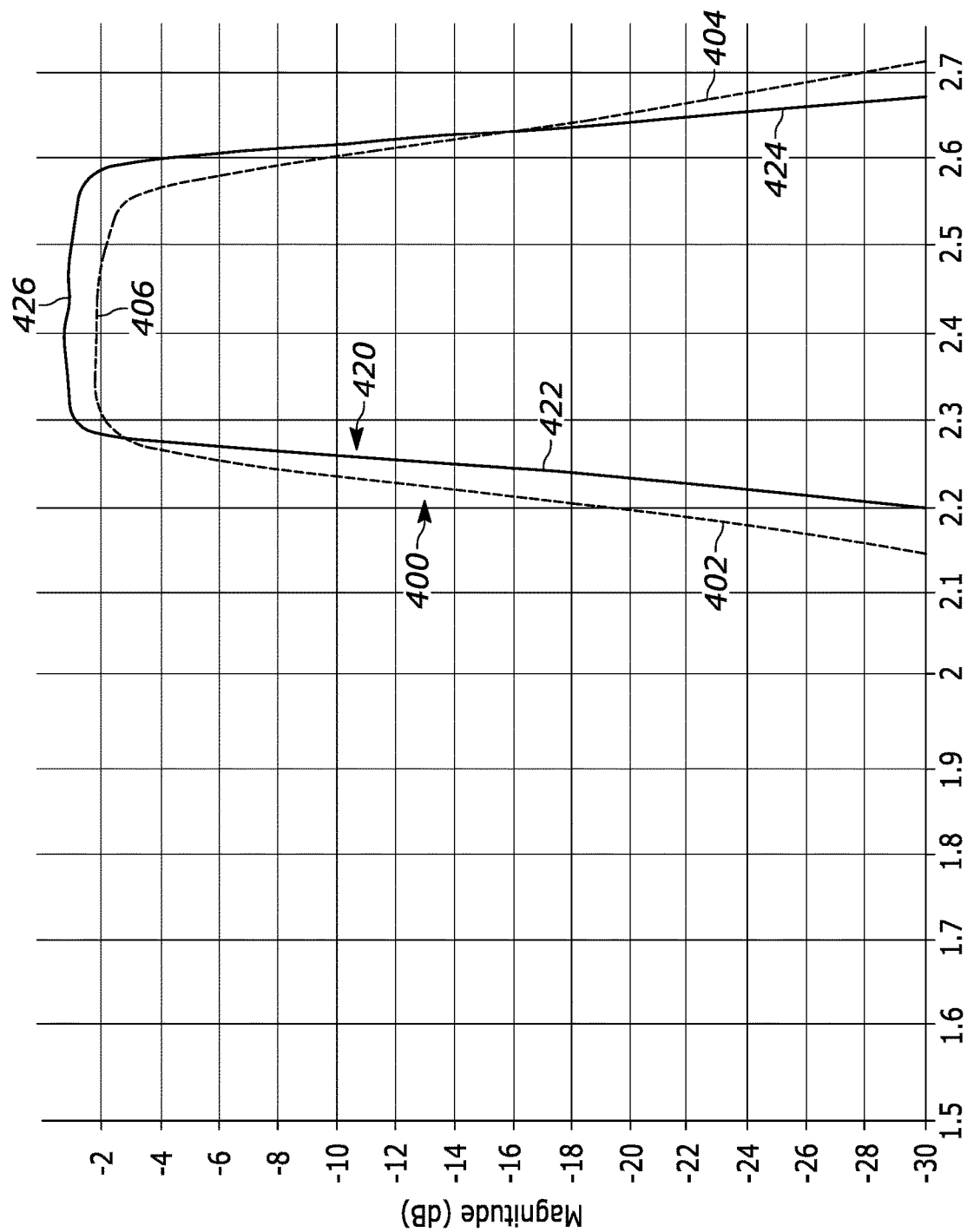
FIG. 9 illustrates comparative passband plots for a prior art bandpass filter having partially-grounded one-quarter wavelength resonators and a bandpass filter having fully grounded one-half wavelength resonators according to the present disclosure.

FIG. 9 illustrates a passband plot 400 for a prior art printed film RF micros trip filter having one-quarter wavelength resonators with one end ground and the other end ungrounded and a frequency plot 420 for a printed film RF microstrip filter having one-half wavelength resonators with both ends grounded as described herein. Both printed film filters have six poles and use the same dielectric material 0.05 mils thick and having a relative dielectric constant of 90. Both filters comprise a 0.2 mil thin conductive film having the same composition. The filter having the one-half wavelength resonators comprises metalized sidewall interconnecting the resonators to the ground plane, and the filter having one-quarter wavelength resonators comprises conductive vias interconnecting the resonators to the ground plane. The grounded one-half wavelength resonators have a higher Q factor than the partially-grounded one-quarter wavelength resonators. The filter having the grounded one-half wavelength resonators has a significantly improved insertion loss of about 1 dB compared to the 2 dB insertion loss of the filter having partially-grounded one-quarter wavelength resonators. The filter having grounded one-half wavelength resonators also has significantly improved stop band rejection shown by the relative steepness of the passband skirts 422 and 424 compared to the passband skirts 402, 404 of the filter having one-quarter wavelength resonators. The filter having grounded one-half wavelength resonators also has a more flat or even passband characteristic 426 compared to the passband 406 of the filter having one-quarter wavelength resonators.

In one embodiment, the printed film radio frequency micros trip bandpass filter comprises a plurality of resonators disposed on a dielectric substrate, first and second input/output (I/O) interfaces connected to corresponding first and second resonators on opposite side of one or more intermediate resonators. Opposite ends of the one or more intermediate resonators are connected to a ground plane on an opposite side of the substrate by corresponding conductors on opposite side walls of the substrate. The intermediate resonators have an electrical wavelength that is one-half a wavelength of a center frequency of the filter and the first and second resonators have an electrical wavelength that is nominally one-half the wavelength of the bandpass filter center frequency. The first resonator, the second resonator and the one or more intermediate resonators can have a common length between the opposite side walls of the substrate, wherein the first and second resonators have a greater width than a width of the one or more intermediate resonators.

In another embodiment, the printed film radio frequency micros trip bandpass filter comprises a plurality of resonators disposed on a dielectric substrate, first and second input/output (I/O) interfaces connected to corresponding first and second resonators on opposite side of one or more intermediate resonators. Opposite ends of the one or more intermediate resonators are connected to a ground plane on an opposite side of the substrate by corresponding conductors on opposite side walls of the substrate. The intermediate resonators have an electrical wavelength that is one-half a wavelength of a center frequency of the filter and the first and second resonators have an electrical wavelength that is nominally one-half the wavelength of a center frequency of the passband. The first and second resonators have a length greater than a length of the one or more intermediate resonators.

In these and other embodiments, the first and second resonators can have an electrical wavelength that is one-half the wavelength of the bandpass filter center frequency. Alternatively, the first and second resonators can have an electrical wavelength that is nominally one-half the wavelength of the bandpass filter center frequency. The one or more intermediate resonators have a length to width aspect ratio not greater than 8 and the first and second resonators have an aspect ratio less than an aspect ratio of the one or more intermediate resonators.

In these and other embodiments, the printed film radio frequency micros trip bandpass filter is a three-pole thin film bandpass filter having passband between 9 GHz and 10 GHz and an insertion loss less than 0.5 dB. The substrate comprises a ceramic material having a Q factor greater than 1000, a thickness between 15 thousandths of an inch (mil) and 25 mil, and a dielectric constant between 8 and 15. The intermediate resonators have an unloaded Q factor greater than 500.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A printed film radio frequency microstrip bandpass filter comprising:
   a dielectric substrate having a ground plane on a first surface of the substrate;
   a first resonator on a second surface, opposite the first surface, of the substrate, the first resonator having a length between lateral side portions of the substrate, opposite ends of the first resonator coupled to the ground plane;
   a first input/output (I/O) interface on the substrate connected to the first resonator by a conductor;
   a second resonator on the second surface of the substrate, the second resonator having a length between the lateral side portions of the substrate, opposite ends of the second resonator coupled to the ground plane;
   a second I/O interface on the substrate connected to the second resonator by a conductor;
   one or more intermediate resonators on the second surface of the substrate between the first resonator and the second resonator, each of the one or more intermediate resonators having a length between the lateral side portions of the substrate and an electrical wavelength that is one-half a wavelength of a center frequency of the bandpass filter,
   opposite ends of the one or more intermediate resonators directly electrically connected to the ground plane by corresponding conductors.

2. The bandpass filter of claim 1 further comprising:
   a first conductor on a first side wall of the substrate, the first conductor connecting the ground plane to first ends of the first resonator, the second resonator and the one or more intermediate resonators;
   a second conductor on a second side wall of the substrate, opposite the first side wall, the second conductor connecting the ground plane to second ends of the first resonator, the second resonator and the one or more intermediate resonators.

3. The bandpass filter of claim 2, wherein the first and second resonators have an electrical wavelength that is one-half the wavelength of the center frequency of the bandpass filter.

4. The bandpass filter of claim 2, wherein the first and second resonators have an electrical wavelength that is nominally one-half the wavelength of the center frequency of the bandpass filter.

5. The bandpass filter of claim 1 further comprising:
   a first plurality of conductive vias extending through the substrate and along a first side wall of the substrate, the first plurality of conductive vias connecting the ground plane to first ends of the first resonator, the second resonator and the one or more intermediate resonators;
   a second plurality of conductive vias extending through the substrate and along a second side wall of the substrate, opposite the first side wall, the second plurality of conductive vias connecting the ground plane to second ends of the first resonator, the second resonator and the one or more intermediate resonators.

6. The bandpass filter of claim 1, the first resonator, the second resonator and the one or more intermediate resonators having a common length between the lateral side portions of the substrate, wherein the first and second resonators have a greater width than a width of the one or more intermediate resonators.

7. The bandpass filter of claim 1, wherein the one or more intermediate resonators have a length to width aspect ratio not greater than 8 and the first and second resonators have an aspect ratio less than an aspect ratio of the one or more intermediate resonators.

8. The bandpass filter of claim 1, wherein the first and second resonators have a longer length than the one or more intermediate resonators.

9. The bandpass filter of claim 1, wherein the first resonator, the second resonator and the one or more intermediate resonators are arranged symmetrically relative to longitudinal and transverse axes of the substrate.

10. The bandpass filter of claim 1 is a thin film bandpass filter having three poles, the substrate comprises a ceramic material having a thickness between 15 mil and 25 mil and a dielectric constant between 8 and 15, and the one or more intermediate resonators having an unloaded quality factor greater than 500, wherein the thin film bandpass filter has a passband between 9 GHz and 10 GHz and an insertion loss less than 0.5 dB.

11. A printed film radio frequency microstrip bandpass filter comprising:
   a dielectric substrate having a ground plane on a first surface of the substrate;
   a first resonator on a second surface, opposite the first surface, of the substrate, the first resonator having a length between opposite side walls of the substrate;

a first input/output (I/O) interface on the substrate connected to the first resonator;
a second resonator on the second surface of the substrate, the second resonator having a length between the opposite side walls of the substrate;
a second I/O interface on the substrate connected to the second resonator by a conductor;
one or more intermediate resonators on the second surface of the substrate between the first resonator and the second resonator, each of the one or more intermediate resonators having a length between the opposite side walls of the substrate and an electrical wavelength that is one-half a wavelength of a center frequency of the bandpass filter;
a first conductor on a first side wall of the substrate, the first conductor connecting the ground plane to first ends of the first resonator, the second resonator and the one or more intermediate resonators;
a second conductor on a second side wall of the substrate, opposite the first side wall, the second conductor connecting the ground plane to second ends of the first resonator, the second resonator and the one or more intermediate resonators;
the first resonator, the second resonator and the one or more intermediate resonators having a common length between the opposite side walls of the substrate, wherein the first and second resonators have a greater width than a width of the one or more intermediate resonators.

12. The bandpass filter of claim 11, wherein the first and second resonators have an electrical wavelength that is one-half the wavelength of the center frequency of the bandpass filter.

13. The bandpass filter of claim 11, wherein the first and second resonators have an electrical wavelength that is nominally one-half the wavelength of the center frequency of the bandpass filter.

14. The bandpass filter of claim 11, wherein the one or more intermediate resonators have a length to width aspect ratio not greater than 8 and the first and second resonators have an aspect ratio less than an aspect ratio of the one or more intermediate resonators.

15. The bandpass filter of claim 11 is a thin film bandpass filter having three poles, the substrate comprises a ceramic material having a thickness between 15 mil and 25 mil and a dielectric constant between 8 and 15, and the one or more intermediate resonators having an unloaded quality factor greater than 500, wherein the thin film bandpass filter has a passband between 9 GHz and 10 GHz and an insertion loss less than 0.5 dB.

16. A printed film radio frequency microstrip bandpass filter comprising:
a dielectric substrate having a ground plane on a first surface of the substrate;
a first resonator on a second surface, opposite the first surface, of the substrate, the first resonator having a length between opposite side walls of the substrate;
a first input/output (I/O) interface on the substrate connected to the first resonator;
a second resonator on the second surface of the substrate, the second resonator having a length between the opposite side walls of the substrate;
a second I/O interface on the substrate connected to the second resonator by a conductor;
one or more intermediate resonators on the second surface of the substrate between the first resonator and the second resonator, each of the one or more intermediate resonators having a length between the opposite side walls of the substrate and an electrical wavelength that is one-half a wavelength of a center frequency of the bandpass filter;
a first plurality of conductive vias extending through the substrate and along a first side wall of the substrate, the first plurality of conductive vias connecting the ground plane to first ends of the first resonator, the second resonator and the one or more intermediate resonators;
a second plurality of conductive vias extending through the substrate and along a second side wall of the substrate, opposite the first side wall, the second plurality of conductive vias connecting the ground plane to second ends of the first resonator, the second resonator and the one or more intermediate resonators;
the first resonator and the second resonator having a length that is greater than a length of the one or more intermediate resonators.

17. The bandpass filter of claim 16, wherein the first and second resonators have an electrical wavelength that is one-half the wavelength of the center frequency of the bandpass filter.

18. The bandpass filter of claim 16, wherein the first and second resonators have an electrical wavelength that is nominally one-half the wavelength of the center frequency of the bandpass filter.

19. The bandpass filter of claim 16, wherein the one or more intermediate resonators have a length to width aspect ratio not greater than 8 and the first and second resonators have an aspect ratio less than an aspect ratio of the one or more intermediate resonators.

20. The bandpass filter of claim 16 is a thin film bandpass filter having three poles, the substrate comprises a ceramic material having a thickness between 15 mil and 25 mil and a dielectric constant between 8 and 15, and the one or more intermediate resonators having an unloaded quality factor greater than 500, wherein the thin film bandpass filter has a passband between 9 GHz and 10 GHz and an insertion loss less than 0.5 dB.

* * * * *